United States Patent
Bakry et al.

(10) Patent No.: US 10,755,106 B1
(45) Date of Patent: Aug. 25, 2020

(54) PATTERN RECOGNITION FOR HABIT ENGAGEMENT, MISTAKE AVOIDANCE, AND OBJECT FINDING USING SENSOR DATA

(71) Applicant: Amazon Technologies, Inc., Seattle, WA (US)

(72) Inventors: Amr Bakry, Santa Clara, CA (US); Mashhour Solh, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 246 days.

(21) Appl. No.: 15/975,300

(22) Filed: May 9, 2018

(51) Int. Cl.
G06K 9/00 (2006.01)
H04L 29/08 (2006.01)

(52) U.S. Cl.
CPC ....... G06K 9/00771 (2013.01); G06K 9/0063 (2013.01); G06K 9/00369 (2013.01); G06K 9/00744 (2013.01); H04L 67/26 (2013.01); G06K 2209/21 (2013.01)

(58) Field of Classification Search
CPC ........... G06K 9/00288; G06K 9/00771; G06K 9/00369; G06K 9/0063; G06K 9/00744; G06K 9/00362; G06K 2209/21; G06T 7/20; H04L 67/26
USPC ...................................................... 382/170
See application file for complete search history.

(56) References Cited

U.S. PATENT DOCUMENTS

| | | | | |
|---|---|---|---|---|
| 6,796,799 | B1* | 9/2004 | Yoshiike | G06F 19/3418 |
| | | | | 434/236 |
| 8,244,063 | B2* | 8/2012 | Shechtman | G06K 9/64 |
| | | | | 382/178 |
| 9,659,221 | B2* | 5/2017 | Renner | G06K 9/00771 |
| 10,032,326 | B1* | 7/2018 | Landers, Jr. | G06K 9/00228 |
| 2012/0219271 | A1* | 8/2012 | Vunic | G06K 9/00711 |
| | | | | 386/278 |
| 2013/0027561 | A1* | 1/2013 | Lee | G06Q 30/02 |
| | | | | 348/150 |
| 2013/0081082 | A1* | 3/2013 | Riveiro Insua | H04N 21/23109 |
| | | | | 725/38 |
| 2018/0357870 | A1* | 12/2018 | Siminoff | G08B 13/19606 |

(Continued)

OTHER PUBLICATIONS

Geitgey; Machine Learning is Fun! Part 4: Modern Face Recognition with Deep Learning; Jul. 24, 2016; Retrieved from https://medium.com/@ageitgey/machine-learning-is-fun-part-4-modern-face-recognition-with-deep-learning-c3cffc121d78 on May 1, 2018; 20 pgs.

(Continued)

Primary Examiner — Ali Bayat
(74) Attorney, Agent, or Firm — K&L Gates LLP

(57) ABSTRACT

Systems and techniques are generally described for pattern recognition in video data. In some examples, a first set of pixels representing a first person in the first video data may be determined. First feature representation data of the first set of pixels may be generated. The first feature representation data may be determined to correspond to second feature representation data stored in memory. An identity of the first person associated with the second feature representation data may be determined. A first action associated with the first person may be determined. A notification may be sent to a computing device accessible by the first person. The notification may include a reminder for the first person to engage in the first action.

20 Claims, 6 Drawing Sheets

(56) References Cited

U.S. PATENT DOCUMENTS

2019/0114485 A1* 4/2019 Chan .................. H04N 21/2187

OTHER PUBLICATIONS

Wikipedia contributors; "Passive Infrared Sensor"; *Wikipedia, The Free Encyclopedia*; Apr. 16, 2018, Retrieved from https://en.wikipedia.org/wiki/Passive_infrared_sensor on May 1, 2018; 6 pgs.

* cited by examiner

| Pattern | Person(s) | First Action / Associated object(s) | Second Action / Associated object(s) | ... | Final Action / Associated object(s) |
|---|---|---|---|---|---|
| 460 | 150a | Action 462a / Dog 177 | Action 462b / Ball | | Action 462n / Dog & Ball |
| 470 | 150b | Action 472a / Bed 174 | N/A | | N/A |
| 480 | 150c | Action 482a | Action 482b | | N/A |
| 490 | 150b | Action 492a | Action 492b | | Action 492n |

FIG. 4B

PATTERN RECOGNITION FOR HABIT ENGAGEMENT, MISTAKE AVOIDANCE, AND OBJECT FINDING USING SENSOR DATA

BACKGROUND

Camera systems may use a camera and/or a set of cameras to capture video data of areas of interest. For example, cameras may be positioned so as to surveil an entryway into a secure area such as a bank vault or an entrance to a private residence. In some examples, computing devices may include sensors such as cameras and/or microphones effective to capture video and audio data. Video and/or audio data may be processed by the computing device and/or may be sent over a network to one or more other computing devices for processing.

BRIEF DESCRIPTION OF DRAWINGS

FIG. 4B depicts an example data structure storing pattern data and action data, in accordance with various embodiments of the present disclosure.

DETAILED DESCRIPTION

Figure 1:
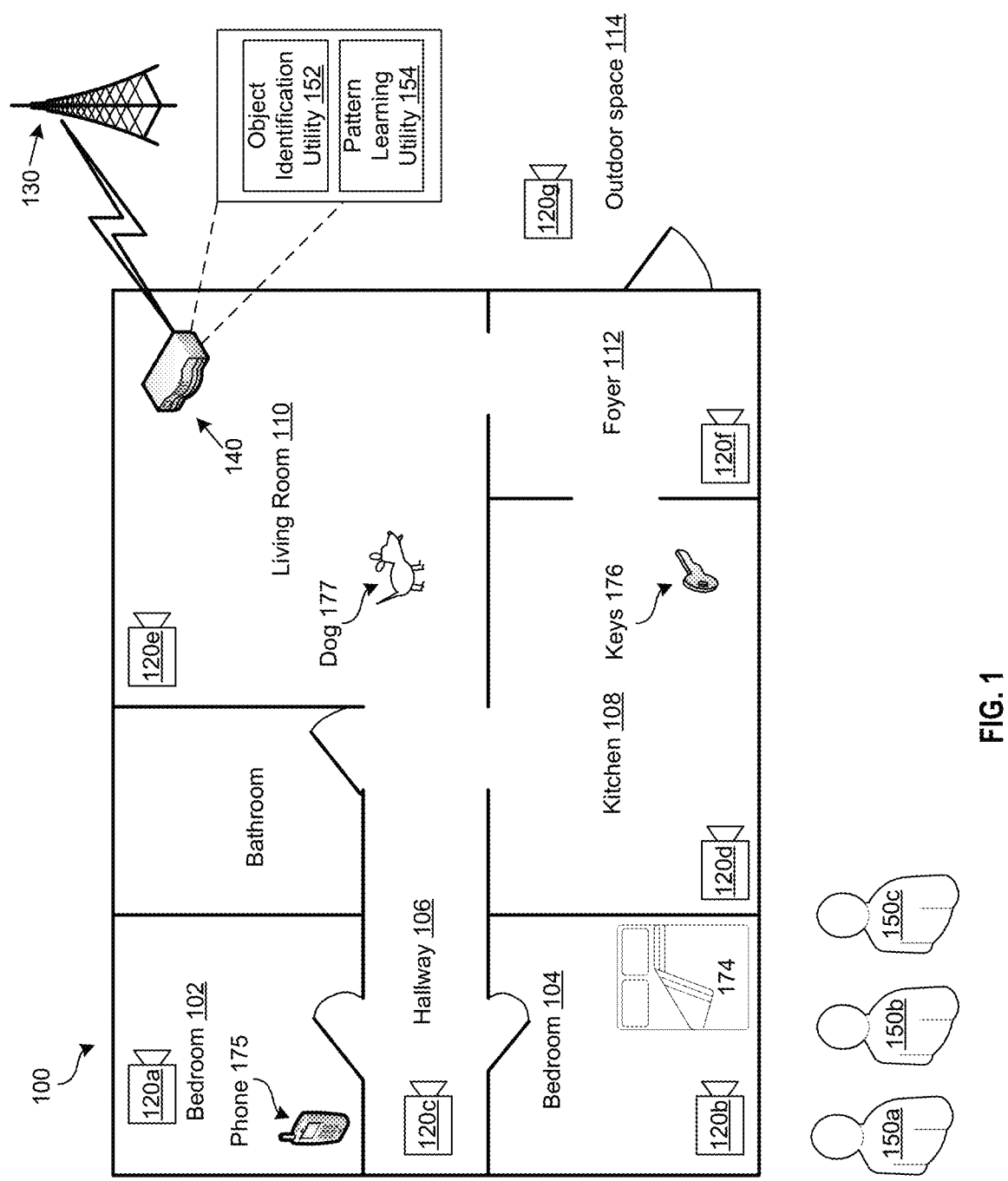
FIG. 1 is a diagram illustrating a building with a camera system installed therein with a video processing device effective to detect and recognize objects and/or patterns, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices. Camera devices may be stand-alone camera devices or may be incorporated into one or more computing devices. In some examples, camera devices and/or computing devices configured in communication with the camera devices may include microphones effective to capture audio data.

In various examples, camera devices and/or computing devices configured in communication with camera devices may be configured in communication with one or more other types of sensors. For example, camera devices may be configured in communication with passive infrared (PIR) sensors effective to detect infrared (IR) radiation emitted by objects within the PIR sensors' fields-of-view. The PIR sensors may be used to detect motion within the environment monitored by the PIR sensors. In various examples, a PIR sensor may be effective to determine when an object passes through a PIR sensor's field-of-view by determining differential changes in the detected IR. PIR sensors often include two sensor "halves". The differential change is the difference in detected radiation between the two sensor halves. If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by the sensor.

In some examples, camera devices and/or computing devices configured in communication with camera devices may send captured video data and/or audio data to a central processing device that may be effective to take one or more actions such as storing the video data in one or more memories, processing the video data, sending the video data to one or more other devices for processing, and/or sending an indication or alert indicating that motion has been detected in the environment monitored by the camera device and/or providing optional access to video captured by the camera device. In various examples, the central processing device may be located within the same building or grouping of buildings as the camera device(s); however, in some other examples, the central processing device may be remotely located from the camera device(s) and may communicate with the camera device(s) over a wide area network (WAN) such as the Internet.

In various examples, camera devices may communicate with one another and/or with a central processing device via a short-range communication protocol such as Bluetooth® or Bluetooth® Low Energy (BLE). In various other examples, the camera device(s) and/or a central processing device may communicate with one another using a wireless local area network (WLAN) using, for example, the IEEE 802.11 standard.

In some examples, a central processing device may communicate with the camera device(s) using a wireless network such as a WLAN via the 900 MHz band or some other frequency band. In some examples, the central processing device may be effective to receive user requests (e.g., from a user mobile device and/or from a companion application on a user mobile device) to access image data and/or video data that is accessible via the central processing device and/or via the camera devices. For example, the central processing device may receive a request from a mobile device (e.g., a mobile device authenticated to the central processing device) for particular video data captured by a particular camera device during a first timeframe (e.g., at a time of day and/or an interval of times). In the example, the central processing device may stream the video to the authenticated mobile device. In some other examples, an authenticated mobile device may request a live video feed from one or more camera device(s). In the example, the central processing device may be effective to control the relevant camera device(s) to begin capturing video data. The central processing device may be effective to control the relevant camera device(s) to stream the video data to the requesting mobile device. In other embodiments, the relevant camera device(s) may send the video data to the central processing device which may, in turn, send the video data to the requesting mobile device (after video processing, for example). In at least some examples, the central processing device may be powered by a wired connection to a wall outlet or other power source.

In accordance with various techniques described herein, a central processing device and/or one or more local and/or remote computing devices may receive video data and/or audio data from the camera devices. A device receiving video data and/or audio data for further processing may generally be referred to herein as a video processing device(s).

Upon receiving video data and/or audio data, video processing device(s) be may effective to detect objects and/or people in video data. For example, the video processing device(s) may detect objects with which people routinely interact. Additionally, the video processing device(s) may detect people (from among video data representing non-people such as objects and/or animals) in the video data. The video processing device(s) may be effective to perform human recognition techniques to identify people and distinguish people from one another. Similarly, the video processing device(s) may perform object recognition techniques to distinguish and identify different objects represented in video and/or audio data. To simplify the description herein, the term "object" may sometimes be used herein to refer any physical entity represented in image and/or video data—including people, animals, and/or object.

After identifying different objects in video data and/or audio data (e.g., within a particular segment of video data and/or audio data), video processing device(s) may be effective to learn one or more patterns associated with particular objects and/or people. For example, video processing device(s) may comprise one or more machine learning models that learn that "Person A" (e.g., a family member) tends to interact with object "Bed" during a timeframe from about 21:40-22:16. In another example, a machine learning model of the video processing device(s) may learn that Person B (e.g., a parent) tends to interact with Person C (e.g., a child) in the living room between 18:00-18:42 every weekday. In the example, the parent (e.g., Person B) may tend to play with their child (e.g., Person C) between 18:00-18:42 in the living room after the parent returns from work each weekday. Additionally, after learning to recognize objects commonly interacted with by one or more people (e.g., as part of a learned pattern or habit of the person), video processing device(s) may track the location of various recognized objects. In an example, objects designated as objects-of-interest by a user of system 100 may be tracked by system 100, in accordance with the various techniques described herein. Video processing device(s) may store current locations of recognized objects-of-interest in a memory associated with the video processing device(s).

The video processing device(s) may provide an interface for human interaction with the various object recognition and/or tracking utilities and/or the pattern-recognition utilities described above. For example, a companion application may be associated with the video processing device(s) and/or the various sensors such as camera devices and/or microphones. The video processing device(s) may provide notifications (e.g., push notifications) to a user of the companion application (e.g., someone associated with the camera devices such as a family member in a home in which the camera devices are installed and/or an employee of a workplace in which the camera devices are installed). The companion application may require user authentication to prior to providing the various services described herein.

In some examples, video processing device(s) may send reminder notifications to a user mobile device (e.g., push notifications through the companion application). For example, the video processing device(s) may send a reminder that Person A needs to leave for work upon recognition that Person A normally goes to work during a timeframe of "Mondays between 08:00 and 08:15" and that Person A is currently deviating from this pattern at a current time of day corresponding to the timeframe. In various examples, a reminder may be sent to a user based on a pattern associated with the user that occurs at a specific, upcoming time. For example, Person B may be associated with a learned pattern of reading during the timeframe from 19:00 to 20:00. Accordingly, video processing device(s) may send a reminder at 18:45 for person to engage in reading in 15 minutes. Similarly, the video processing device(s) may send alerts to an individual to aid the individual in avoiding potential mistakes. For example, the video processing device(s) may recognize the object "wallet" which may be associated with Person A. The video processing device(s) may recognize that Person A is leaving the house (either according to a previously recognized pattern, such as leaving for work, or according to unrecognized activity). The video processing device(s) may have recognized a pattern that Person A typically takes their wallet with them prior to leaving the house. Accordingly, the video processing device(s) may send a notification to the user. The notification may indicate that Person A does not have their wallet with them and may, in some examples, specify a current location of the wallet. In some examples, the video processing device(s) may send notifications comprising a prompt for instructions to track newly-recognized objects and/or objects that are part of a set of actions corresponding to a pattern or habit associated with a user of the system.

In various examples, the video processing device(s) may be configurable (e.g., through the companion application) as to when, how often, and whether or not to send push notifications, different types of alerts, confirmation requests, and/or inquiries of whether to track and/or store various types of data. For example, a user of the companion application may disable pattern recognition and matching for a particular person. Accordingly, the settings of video processing device(s) may be adjusted to account for different privacy concerns of different users.

In some further examples, a user of the various systems described herein may request a location of a lost object (e.g., through the companion application). For example, a user may be unable to locate their keys. The user may request a location of the user's keys through the companion application. If the video processing device(s) have previously learned to recognize the user's keys, the video processing device(s) may determine based on video data received from one or more camera devices monitoring the user's home the current location of the keys. The video processing device(s) may provide a message indicating the location of the keys to the companion application. For example, the video processing device(s) may provide an indication of the room in which the keys are located (e.g., a room name associated with one or more camera devices previously provided during user registration and/or through the companion application) and may provide image data showing the location of the requested object for display on the companion application. In some examples, the companion application may be effective to emphasize the particular object through color intensity, highlighting, annotation, etc.

In some examples, the video processing device(s) may alert users that a new object, person, and/or pattern has been recognized. The video processing device(s) may provide an opportunity (e.g., through the companion application, a browser-based interface, and/or some other interface) for the user to name the particular object, person, and/or pattern. In various examples, the video processing device(s) may store an identifier for newly-identified objects, persons, and/or patterns to identify these objects, persons, and/or activities from among other objects, persons, and/or activities. The video processing device(s) may display images and/or video clips corresponding to the newly identified person, object, and/or pattern so that the user is able to provide information (e.g., a name) to the vide processing device(s) concerning the object, person, and/or pattern. Additionally, the video processing device(s) may provide an option to delete or "not remember" the particular person, object, and/or pattern.

FIG. 1 is a diagram illustrating a building with a camera system 100 installed therein, in accordance with some embodiments of the present disclosure. System 100 may include one or more camera devices (e.g., camera devices 102a, 102b, etc.) and/or video processing device(s) 140. In FIG. 1, the building may be a residential dwelling with a bedroom 102, a bedroom 104, a hallway 106, a bathroom, a kitchen 108, a living room 110, a foyer 112, and a monitored outdoor space 114. Camera devices 120a, 120b, 120c, 120d, 120e, 120f, and 120g may be associated with various areas of building. For example, camera device 120a may be positioned so as to monitor all or a portion of bedroom 102. Camera device 120b may be positioned so as to monitor all or a portion of bedroom 104. Camera device 120c may be positioned so as to monitor all or a portion of hallway 106. Camera device 120d may be positioned so as to monitor all or a portion of kitchen 108. Camera device 102e may be positioned so as to monitor all or a portion of living room 110. Camera device 102f may be positioned so as to monitor all or a portion of foyer 112. Camera device 120g may be positioned so as to monitor all or a portion of outdoor space 114. In various examples, more or fewer camera devices may be used to monitor a given area, in accordance with the desired implementation. In some examples, one or more of the camera devices may include and/or be in communication with microphones and may be effective to capture image data. Additionally, the camera devices of camera system 100 need not be dedicated camera devices. Instead, the camera devices may include computing devices configured in communication with one or more image sensors and/or microphones.

In the example depicted in FIG. 1, a video processing device(s) 140 is situated in living room 110. Video processing device(s) 140 may be one or more computing devices including at least one processor and a computer-readable non-transitory memory effective to perform one or more of the object detection, object recognition, and/or pattern recognition techniques described herein.

In various examples, video processing device(s) 140 may be effective to communicate with camera devices 120a, 120b, 120c, 120d, 120e, 120f, and/or 120g. For example, video processing device(s) 140 may communicate with camera devices 120a, 120b, 120c, 120d, 120e, 120f, and/or 120g over a local area network (LAN). For example, camera devices 120a, 120b, 120c, 120d, 120e, 120f, and/or 120g may communicate with video processing device(s) 140 wirelessly through a wireless router in building. In some other examples, video processing device(s) 140 may be remotely located from the building in which the camera devices (and/or other sensors) are located. For example, video processing device(s) 140 may be a computing device accessible over a network such as the internet. Additionally, in some examples, video processing device(s) 140 may be a distributed computing environment where various functions are performed by one device, while various other functions are performed by one or more other devices. In at least some examples, video processing device(s) 140 may be effective to communicate wirelessly with one or more other devices over a wide area network, such as the Internet. For example, as described in further detail below, in some examples, video processing device(s) 140 may send alerts and/or notifications to one or more user devices associated with users of the system 100. In at least some examples, such alerts and/or notifications may be sent to mobile devices via, for example, a base station 130. In other examples, video processing device(s) 140 may trigger one or more other computing devices to send alerts and/or notifications.

Person 150a, person 150b, and person 150c may be associated with the building depicted in FIG. 1. For example, persons 150a, 150b, and 150c may be a family living in the building. Video processing device(s) 140 may be effective to detect and recognize person 150a, person 150b, and person 150c, or any other person, using object identification utility 152, in accordance with the various techniques described herein. Additionally, video processing device(s) 140 may be effective to determine and recognize patterns of actions associated with person 150a, 150b, and 150c, using pattern learning utility 154. Additionally, video processing device(s) 140 may be effective to detect and/or recognize one or more objects in fields of view of camera devices 120a, 120b, 120c, 120d, 120e, 120f, and/or 120g using object identification utility 152. Video processing device(s) 140 may be effective to detect and/or recognize one or more patterns associated with people (e.g., person 150a, 150b, and/or 150c) and objects (e.g., bed 174, phone 175, keys 176, and/or dog 177) of people, pets, and/or objects associated with building. In various examples, data representing recognized persons, objects, and/or patterns may be stored in a memory accessible by video processing device(s) 140. Additionally, timeframes, days of the week, days of the year, and/or other metadata that may be associated with patterns may be stored in the memory. Object identification utility 152 and pattern learning utility 154 are described in further detail below in reference to FIGS. 2, 3, and 4.

Figure 2:
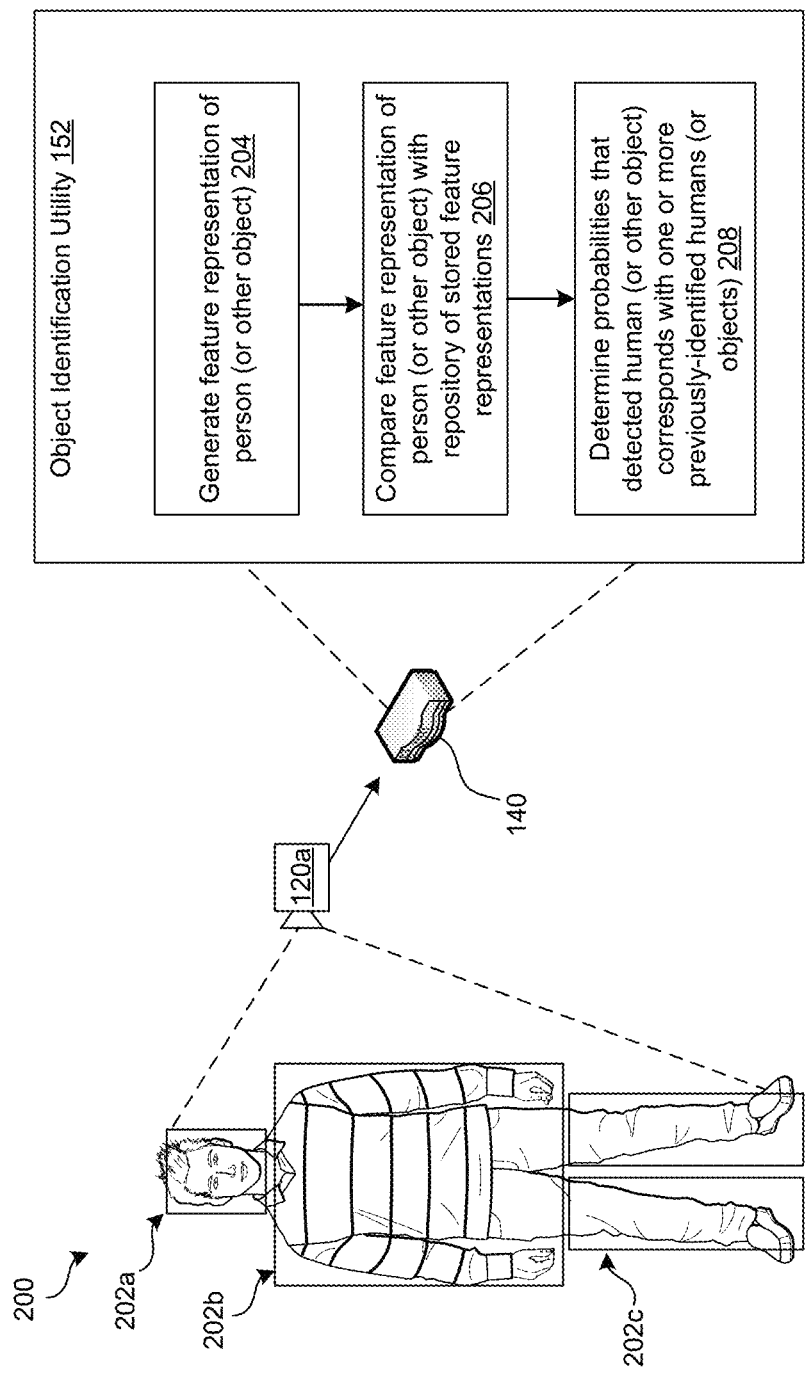
FIG. 2 depicts an example process for object detection and recognition, in accordance with various embodiments of the present disclosure.

FIG. 2 depicts an example process for object detection and recognition, in accordance with various embodiments of the present disclosure. In various examples, object detection and/or recognition may be performed by, for example, an object identification utility 152. Object identification utility 152 may be implemented in software and executed in whole, or in part by, one or more of the camera devices (e.g., camera devices 120a-120g of FIG. 1) of a camera monitoring system, by video processing device(s) 140, and/or by one or more other computing devices.

In machine learning and pattern recognition, the term "feature" may be used to describe an individual measurable property or characteristic of a detectable phenomenon. Generally, features may be selected (and/or learned) in order to classify objects, persons, actions, patterns of actions, etc., using a trained machine learning model. Machine learning algorithms may use numerical representations of features as inputs. In the description herein, numerical representations of features are referred to as "feature representation data" or as "feature vectors". Generally, machine learning models may determine a scalar product of an input feature vector and a vector of weights. The result is compared with stored feature representation data representing previously-identified persons, objects, actions, patterns of actions, etc., in order to determine whether or not the input feature representation data corresponds to a previously-identified person, object, action, pattern, etc. Generally, feature representation data may be "extracted" from input data and "embedded" into one or more machine learning models. In many of the examples described herein, feature representation data are extracted from one or more frames of image data and/or audio data.

Feature representation data refers to a numerical representation of a feature for a particular feature space. A feature space refers to a vector space for a particular feature. For example, for a human recognition machine learning model, the feature space may be a histogram of oriented gradients (HoG) feature space. In the example, a frame of image data including a pixelized representation of a human may be received. An HoG may be a representation of a gradient of pixel intensity, luminance, chrominance, etc., within one or more localized portions of image data representing the human (e.g., on 16×16 pixel blocks of image data). In the example, the HoG representing portions of the image data corresponding to the face of a person may be represented as feature representation data (e.g., a feature vector representing the histogram of oriented gradients for the depicted person's face) for the HoG feature space. Determining the HoG representation of the human face may be referred to as "extracting" the feature representation data from the input image data. The feature representation data may be input into a machine learning model trained using labeled HoG data (e.g., trained for the HoG feature space). Labeled HoG data may be, for example, an HoG representation of a person's face along with an identifier for that person. The machine learning model may determine the scalar product of the input feature representation data and a vector of weights (the weights determined by training the machine learning model). The result may be compared with previously-identified feature representation data stored in memory and probabilities may be determined indicating the likelihood that the input feature representation data (e.g., the input HoG representing the human face) corresponds to a previously-identified person.

Different features and/or groups of features may be selected (and/or learned) depending on the particular types of classifiers and/or machine learning models used. For example, for object identification, as little as a single frame of image data depicting an object may be used to generate feature representation data representing edges detected in the image data representing the object (e.g., portions of the image data in which the image brightness changes sharply along a boundary). In this example, the feature space may be an edge detection feature space.

Similarly, in an action recognition machine learning framework, video data representing a particular action (e.g., a person walking) may be used to generate feature representation data representing the action. For example, the feature representation data may comprise a numerical representation of a timeframe during which the person in the video was walking, a numerical representation of a movement of the legs of the person walking (as represented in video data), a numerical representation of the person's gait, a numerical representation of a speed of movement of the person, a numerical representation of a location of the person, etc. Accordingly, the feature representation data may be a multi-dimensional vector numerically representing a particular feature space for which a particular machine learning model has been trained.

Additionally, multiple layers of machine learning may be used to classify a particular object, person, pattern, action, etc. For example, a first machine learning classifier may be used to identify Person A from a first frame of a video depicting Person A walking. The output of the first machine learning classifier may be used as an input to a second machine learning classifier used to recognize an action. Accordingly, feature representation data passed to the second machine learning classifier may include a numerical representation of the identity of Person A, as determined by the first machine learning classifier.

In various examples, object identification utility 152 may be effective to receive image data and/or video data representing objects—which, as used herein, may refer to humans, physical objects, pets, and/or any other distinct and perceivable, physical entities represented in image and/or video data. For example, video data captured by camera device 120*a* may comprise a frame 200 of image data. Frame 200 may comprise a pixel representation of one or more objects and/or people (e.g., person 150*a*).

Upon receipt of frame 200 (which may be a constituent frame of a video, for example), video processing device(s) 140 may be effective to detect one or more objects present in the frame 200 using object identification utility 152. Object identification utility 152 may predict the location and class of objects present in frame 200. A variety of neural network-based and/or machine learning models may be used to perform object detection.

In some examples, bounding boxes may be determined for various objects represented in frame 200. For example, bounding boxes (such as bounding boxes 202*a*, 202*b*, 202*c*) may be used to bound image data (e.g., pixels and/or blocks of image data) representing portions of an object. In the example depicted in FIG. 2, bounding box 202*a* surrounds pixels representing a face of a human, bounding box 202*b* surrounds pixels representing a body of a human and bounding box 202*c* surrounds pixels representing the legs of the human depicted in frame 200. More or fewer bounding boxes may be used apart from what is shown in FIG. 2. For example, a single bounding box may surround the image data representing the human.

In some examples, facial recognition algorithms may be used to generate feature representation data representing a human face detected in the image data and/or video data. In some further examples, HoG, edge detection, and/or other feature representation data may be extracted for a portion of the image data and/or video data (e.g., for the portion of the image data representing the human within the bounding boxes) to generate feature representation data representing a human detected in image data.

In some further examples, region-based convolutional neural networks (R-CNN) may be used with selective search algorithms to reduce the number of bounding boxes that are input to a classifier to improve speed of object detection. In some other examples, You Only Look Once (YOLO) object detection and/or Single Shot Detector (SSD) may be used to detect objects in frame 200. In at least some examples, SSD may be particularly beneficial, as SSD is a multi-label classifier able to predict different classes of objects (e.g., people, dogs, cats, remote controls, phones, keys, books, etc.). In some other examples, a single detection method may be used for each class (e.g., for each object type).

After classifying various objects present in frame 200, object identification utility 152 may be effective to generate one or more feature vectors (sometimes referred to herein as "feature representation data") representing a depicted object and to compare feature representation data representing the particular object to a repository of feature representation data representing known instances of objects of the relevant class. For example, after object detection, a human may be detected in the image data using SSD. Object identification utility 152 may generate feature representation data representing the human. Object identification utility 152 may compare the feature representation data to known feature representation data representing previously-identified persons. Object identification utility 152 may use a classifier to determine the probability that the feature representation data representing the person in frame 200 corresponds to a known person (e.g., a previously-identified person).

In various examples, particular humans may be associated with a particular monitored location. For example, as previously described, person 150a, 150b, and 150c may be associated with building depicted in FIG. 1. In an example, object identification utility 152 may be effective to receive image data and/or video data representing person 150a (e.g., frame 200). The image data and/or video data representing person 150a may be used to generate one or more feature vectors representing a depicted person (e.g., person 150a).

Generally, at action 204, object identification utility 152 may generate a feature representation of a human. At action 206, object identification utility 152 may compare the feature representation of the human with a repository of stored feature representations of previously-identified humans. For example, object identification utility 152 may determine a distance (e.g., a Euclidean distance) between the feature vector representing the human in frame 200 with feature vectors of previously-identified humans stored in memory. Object identification utility 152 may thereafter be effective to determine probabilities that the detected human corresponds to one of the previously-identified humans at action 208. In various examples, if the probability is above a particular threshold probability (e.g., 70%, 80% or some other value), object identification utility 152 may determine that the human detected in frame 200 corresponds to a previously-identified human. In some other examples, if the detected human does not correspond to any of the previously-identified humans stored in the memory, object identification utility 152 may create a new entry for the feature vector representing the human detected in frame 200 and may store the feature vector in the memory in association with an identifier identifying the feature vector (and thus the human) from among other feature vectors representing other humans. Although, in the previous example, identification of humans is described, the techniques described above may be equally applicable to other types of objects (e.g., pets).

In at least some examples, generation of feature vectors may represent an embedding of the image data and/or video data in the feature space of a machine learning model trained to identify objects. In various examples, the machine learning model may be a convolutional neural network (CNN) or any other suitable model. Additionally, in some examples, during a registration step of the camera system 100 (e.g., a camera system including camera devices 120a, 120b, 120c, 120d, 120e, 120f, 120g and/or video processing device(s) 140), the system 100 may prompt a user or users to provide images or videos of the user (e.g., by standing in front of one or more of camera devices 120a, 120b, 120c, 120d, 120e, 120f, and 120g) so that the object identification utility 152 may generate an album of feature space representations for the particular user. Similarly, during registration, the system 100 may prompt a user or users to provide images or videos of objects (such as keys, phones, pets, etc.) to be recognized and/or tracked by system 100. In some examples, the system 100 may prompt users to provide images and/or video via the companion application.

Accordingly, when new image and/or video data is captured of a particular object, one or more classifiers may be used to determine a distance in terms of the feature vectors from the stored feature space representations of known (e.g., previously-identified) humans. The classifier(s) may determine whether or not the image data and/or video data includes a previously-identified object.

Additionally, instead of providing images for each user, object identification utility 152 may learn identities of users during a training period. For example, in the first two weeks of use, every video stream sent to video processing device(s) 140 may be clustered with videos of the same object being grouped together into a cluster using similarity-matching on image data and/or feature vectors. After the two week (or other suitable time period) training period, each cluster with a sufficient number of video/image instances may be assigned a unique identifier (e.g., an identifier corresponding to the particular object) and the videos/images will be added to an album for that identifier. Accordingly, object identification utility 152 may learn the identity of users and/or other objects over time. Thereafter, classifiers may be used to determine whether or not a person moving within the monitored area corresponds to a previously-identified person. Similarly, classifiers may recognize objects represented in image and/or video data captured by the camera devices of system 100.

In accordance with various aspects of the present disclosure, video processing device(s) 140 may learn and store various trajectories associated with recognized persons and/or objects over different timeframes in a memory associated with video processing device(s) 140. Video processing device(s) 140 may store multiple trajectories in association with each identified person. Additionally, processing device 140 may store one or more trajectories in association with one or more pets or other objects (e.g., cleaning robots, etc.). Trajectory data may generally indicate that a particular person tends to move from one monitored location to another during a particular timeframe. For example, with reference to FIG. 1, video processing device(s) 140 may store trajectory data for person 150b. The trajectory data may indicate that person 150b typically moves from bedroom 102 to hallway 106 around 07:45. The trajectory data may indicate that person 150b moves from hallway 106 to kitchen 108 at 07:46, and from kitchen 108 to foyer 112 at 08:13. In at least some examples, trajectory data may be used to detect and/or recognize patterns, as described in further detail below.

Figure 3:
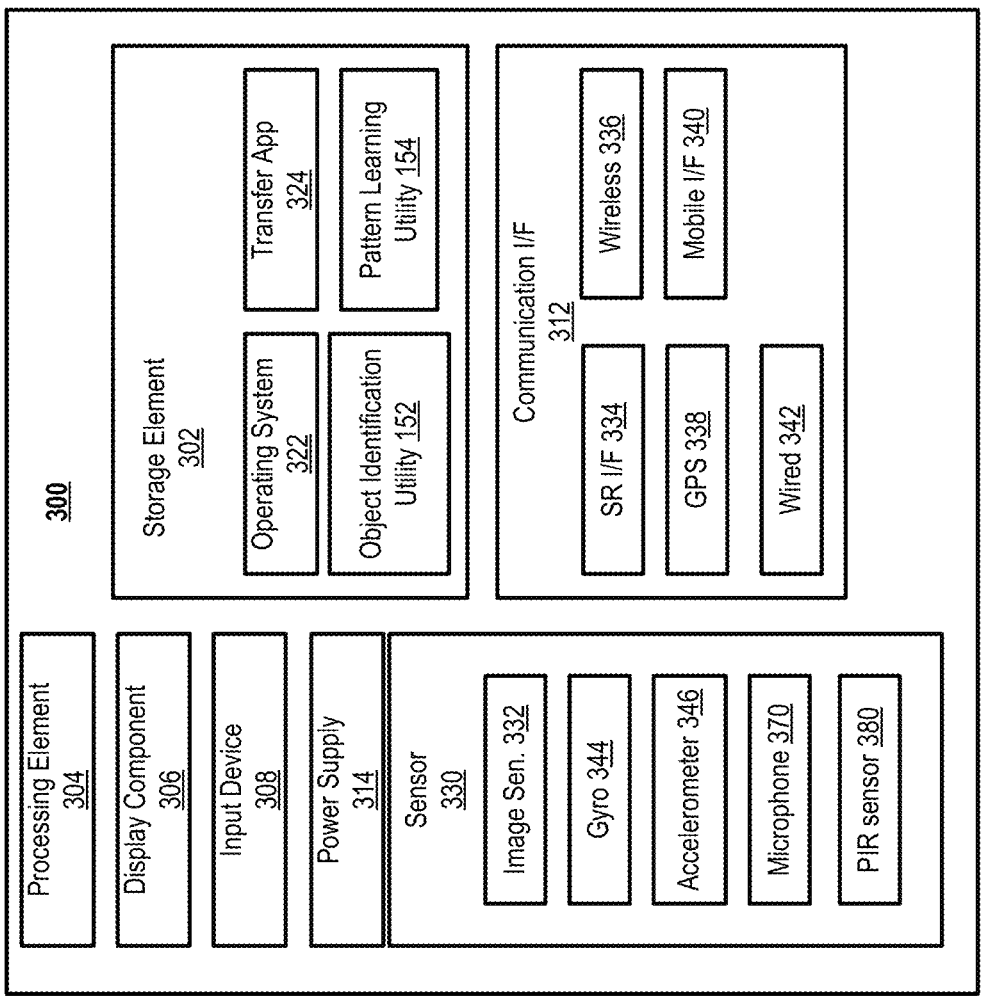
FIG. 3 is a block diagram showing an example architecture of a computing device that may be used in accordance with various aspects of the present disclosure.

FIG. 3 is a block diagram showing an example architecture 300 of a device, such as video processing device(s) 140, camera devices 120a, 120b, 120c, 120d, 120e, 120f, and/or 120g, and/or other devices described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., between camera devices 120a, 120b, 120c, 120d, 120e, 120f, and/or 120g and video processing device(s) 140 and/or between the camera devices and/or video processing device(s) 140 and one or more remotely located computing devices). In some examples, the transfer application 324 may also be configured to upload the received images to another device that may perform processing as described herein (e.g., a mobile device or another computing device). Additionally, the transfer application 324 may be configured to send alerts and/or notifications to one or more mobile computing devices associated with the camera system depicted in FIG. 1. For example, an alert may be sent to a mobile device of a person associated with building when video processing device(s) 140 has determined that a recognized individual has left their house without their keys, deviating from a pattern associated with the recognized individual. The alert and/or notification may indicate a location of the keys. For example, the alert may display an image and/or video from one or more of the camera devices 120a, 120b, 120c, 120d, 120e, 120f, and/or 120g that have captured image data recognized by video processing device(s) 140 as representing the keys. In some further example, transfer application 324 may be effective to send reminders to users of system 100 to remind the user to engage in a particular recognized activity during a particular timeframe. For example, a reminder may be sent for the user to play with his dog or children during a particular timeframe. In another example, the reminder may remind the user to begin meal preparation. In general, and as described in further detail below, video processing device(s) 140 may be effective to learn and recognize patterns of activity associated with recognized people and/or objects. Transfer application 324 may optionally send reminders to the users to engage in the activities during the relevant time periods.

In various examples, object identification utility 152 may be effective to receive image data and/or video data representing objects—which, as used herein, may refer to humans, physical objects, pets, and/or any other distinct and perceivable, physical entities represented in image and/or video data. For example, video data captured by camera device 120a may comprise a frame of image data (e.g., frame 200). A frame of image data may comprise a pixel representation of one or more objects and/or people (e.g., person 150a).

Upon receipt of the frame (which may be a constituent frame of a video, for example), video processing device(s) 140 may be effective to detect one or more objects present in the frame using object identification utility 152. Object identification utility 152 may predict the location and class of objects present in frame. A variety of neural network-based and/or Deep Learning machine learning models may be used to perform object detection. Generally, bounding boxes may be determined for various objects represented in frame.

For example, bounding boxes (such as bounding boxes 202a, 202b, 202c depicted in FIG. 2) may be used to bound image data (e.g., pixels and/or blocks of image data) representing portions of an object. In the example depicted in FIG. 2, bounding box 202a surrounds pixels representing a face of a human, bounding box 202b surrounds pixels representing a body of a human and bounding box 202c surrounds pixels representing the legs of the human depicted in frame 200.

In some examples and as previously described in reference to FIG. 2, facial recognition algorithms may be used to generate a feature vector representing a human face detected in the image data and/or video data. In some further examples, a histogram of gradients (HoG) may be determined for a portion of the image data and/or video data (e.g., for the portion of the image data representing the human within the bounding boxes) to generate a feature vector representing a human detected in image data.

In some further examples and as previously described in reference to FIG. 2, object identification utility 152 may use region-based convolutional neural networks (R-CNN) with selective search algorithms to reduce the number of bounding boxes that are input to a classifier to improve speed of object detection. In some other examples, You Only Look Once (YOLO) object detection and/or Single Shot Detector (SSD) may be used to detect objects in image and/or video data. In at least some examples, SSD may be particularly beneficial, as SSD is a multi-label classifier able to predict different classes of objects (e.g., people, dogs, cats, remote controls, phones, keys, books, etc.). In some other examples, a single detection method (e.g., a separate classifier) may be used for each class (e.g., for each object type).

After classifying various objects present in a frame, object identification utility 152 may be effective to generate one or more feature vectors (sometimes referred to herein as "feature representation data") representing a depicted object and to compare feature representation data representing the particular object to a repository of feature representation data representing known instances of objects of the relevant class. For example, after object detection, a human may be detected in the image data using SSD. Object identification utility 152 may generate feature representation data representing the human. Object identification utility 152 may compare the feature representation data to known feature representation data representing previously-identified persons. Object identification utility 152 may use a classifier to determine the probability that the feature representation data representing the person corresponds to a known person (e.g., a previously-identified person).

In various examples, a pattern learning utility 154 may be effective to learn patterns associated with recognized objects and/or persons. For example, pattern learning utility 154 may determine that person 150a typically interacts with person 150b on Wednesdays between 17:45 and 18:55. In the example, person 150a may be a parent and person 150b may be a child. The interaction between person 150a and person 150b may represent a time at which the parent typically plays with the child. The pattern may be represented using pattern feature representation data (e.g., one or more pattern feature vectors) and may be learned using one or more machine learning methodologies employed by pattern learning utility 154. For example, a long short term memory (LSTM) model may be trained to recognize patterns of activity associated with one or more individuals and/or objects. LSTMs may be advantageous due to the sequential nature of human activity over time. Additionally, LSTM models may function independently of the length of a video segment displaying one or more patterns and/or actions. Patterns may be stored in association with particular people, objects, and/or time periods in a memory associated with video processing device(s) 140 (e.g., within storage element 302).

In various examples, if a previously-unidentified person or object is detected (e.g., an "unrecognized", "unidentified", or "unknown" person or object), object identification utility 152 may generate and store an identifier for the previously-unrecognized person or object. Additionally, if a previously un-identified pattern for a known person or object is detected, pattern learning utility 154 may learn a new pattern and may store the pattern in memory in association with the person and/or object, and in association with a particular day and/or time at which the pattern occurs. In at least some examples, patterns that are unused over a period of time (e.g., 2 weeks, 1 month, 3 days, or any other suitable period of time) may be deleted to conserve memory and because an unused pattern may be a reflection that the represented activity is not one in which the user typically engages.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. A voice recognition engine may interpret audio signals of sound captured by microphone 370. In some examples, the voice recognition engine may listen for a "wake word" to be received by microphone 370. Upon receipt of the wake word, the voice recognition engine may stream audio to a voice recognition server for analysis. In various examples, the voice recognition engine may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network according to any suitable wireless protocol, such as IEEE 802.11 or another suitable wireless local area network (WLAN) protocol. A short range interface 334 may be configured to communicate using one or more short range wireless protocols such as, for example, near field communication (NFC), Bluetooth, BLE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344, PIR sensors 380, and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

Figure 4A:
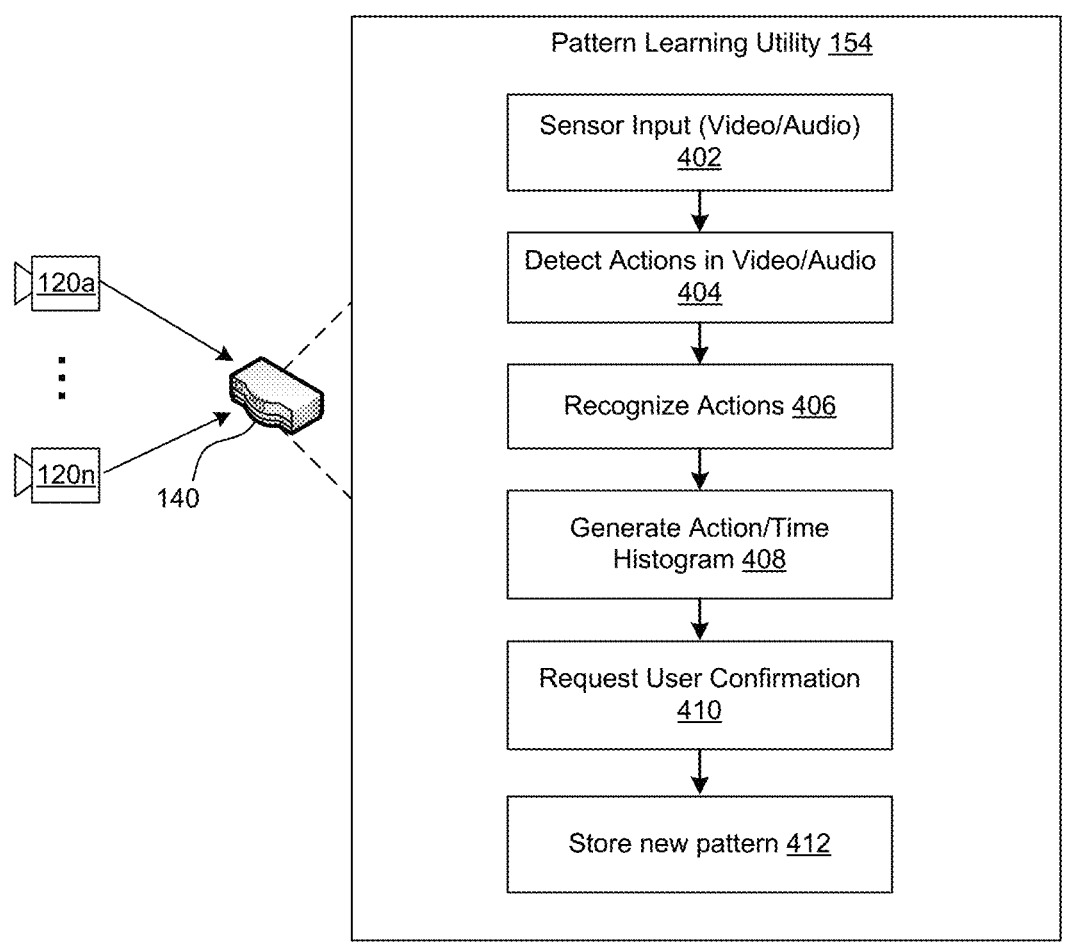
FIG. 4A depicts an example process for pattern recognition, in accordance with various embodiments of the present disclosure.

FIG. 4A depicts an example process for pattern recognition, in accordance with various embodiments of the present disclosure. In various examples, processing may begin at operation 402, at which video processing device(s) 140 may receive video data and/or audio data from one or more sensors. For example, one or more of camera devices 120*a*, 120*b*, 120*c*, 120*d*, 120*e*, 120*f*, and 120*g* of FIG. 1 may send image data, video data, and/or audio data to video processing device(s) 140. In various examples, object identification utility 152 may be used to identify and/or recognize one or more persons and/or objects represented in the data received from the one or more sensors.

In various examples, processing may proceed from operation 402 to operation 404, "Detect actions in video/audio". At operation 404, one or more actions may be detected. For example, if an identified person (e.g., person 150*a*) is determined to be interacting with an identified object (e.g., bed 174), video processing device(s) 140 may detect an action—"Person 150*a* going to bed". The action may be assigned identifier data identifying the action from among other actions by pattern learning utility 154. Actions may be detected based on repeated behaviors of previously-identified individuals (e.g., persons 150a, 150b, and/or 150c). In various examples, video may be segmented into segments and each segment may represent an action. Each of the video segments may be passed over a framework (e.g., input to a machine learning model) to match the video segment with previously-known actions. Examples of previously-identified actions may include jogging, running, picking object up, putting object down, throwing object, lying down, looking at object, etc. The matching process may be performed through a classification process in the feature space of the actions. In the feature space of an action, each point may represent an instance of some activity. Machine learning models may be trained using labeled data to recognize repetitive actions during video segments. The repetitive actions may be associated with previously-identified individuals. The machine learning models may be trained to generate a feature vector representing an action. Generation of a feature vector representative of an action may be referred to as "embedding" the action.

Processing may continue from operation 404 to operation 406, "Recognize actions". At operation 406 actions may be recognized using one or more classifiers trained to recognize actions in video data and/or audio data. For example, the one or more classifiers may be effective to compare a feature representation for a current action to stored feature representations of previously known actions. As used herein, an action may refer to a movement or activity by a person, pet, and/or object during a particular time period. For example, a user of system 100 may be engaged in throwing a ball with a dog during a first timeframe (e.g., during a range of times). Throwing the ball with the dog may be an example of a "pattern" of user activity. The pattern may comprise one or more actions. For example, a first action may be the user throwing the ball. A second action may be the dog retrieving the ball. A third action may be the dog returning the ball to the user. In at least some examples, a pattern may comprise a single action. In other examples, a pattern may comprise multiple actions. Actions and/or patterns may involve one or more previously-detected persons, pets, and/or objects. New, previously-unidentified actions may be assigned an identifier and may be stored in a memory associated with video processing device(s) 140.

Processing may continue from operation 406 to operation 408, "Generate Action/Time Histogram". At action 408, pattern learning utility 154 may generate a histogram of detected actions associated with the times at which the detected actions have occurred. In other words, a distribution of actions over time may be generated. New actions (previously unrecognized actions) may initially have a value of zero. Upon subsequent detection of the new action occurring in the video and/or audio data, the counter for the new action may be incremented or otherwise increased during the time and/or timeframe at which the new action occurred. The action/time histogram may be used to determine a sequence of embedded actions in order to recognize a pattern (sometimes referred to herein as a user "habit"). Various techniques may be used to determine a set of actions corresponding to a pattern (e.g., a user habit). For example, pattern learning utility 154 may determine that action 1, action 2, and action 3, involving person 150a, have occurred between 17:30 and 17:35 more than 10 times during a two week period. Pattern learning utility 154 may determine that actions 1, 2, and 3 are part of a pattern of activity for person 150a. As previously described, LSTM models may be beneficial for recognizing patterns of actions due to the often sequential nature of actions making up a particular pattern and due to the ability of LSTM models to function independently of the length of and/or number of actions and/or patterns. The LSTM model or other machine learning model may generate a feature vector representing the pattern. Feature representation data representing patterns may comprise data representing various constituent actions, associated objects, persons, times, etc., as described below in reference to FIG. 4B.

Processing may continue from operation 408 to operation 410, "Request user confirmation". At operation 410, video processing device(s) 140 may request user confirmation that feature representation data representing one or more patterns of actions determined at operation 408 be stored in memory and tracked by video processing device(s) 140. Accordingly, at operation 410, video processing device(s) 140 may send a confirmation to person 150a (or another user of the system 100) requesting instructions for system 100 to track a pattern comprising actions 1, 2, and 3 and to store the set of actions as a pattern. If the user instructs video processing device(s) 140 to track the pattern, video processing device(s) 140 may store feature representation data representing the pattern in a memory. In various examples, video processing device(s) 140 may request user confirmation through a companion application. Additionally, system 100 may provide one or more configuration options to a user of system 100. For example, configuration options may include providing a user with an ability to name a particular pattern and/or action, providing the user with an option to be reminded about the particular pattern, and/or action, an option to forget or "not track" the particular pattern and/or action. In various examples, the system 100 may provide video clips, audio clips, and/or still images to the user representing the pattern and/or one or more of the actions of the pattern in order to provide information regarding the actions and/or patterns to the user to provides cues to the user for the purposes of naming and/or user recognition of the patterns and/or actions.

Processing may continue from operation 410 to operation 412, "Store new pattern". Upon receiving user confirmation at operation 410, video processing device(s) 140 may store any new set of actions corresponding to a user pattern or habit in a non-transitory computer-readable memory associated with video processing device(s) 140. In at least some examples, video processing device(s) 140 may store a set of actions corresponding to a pattern only when a user has confirmed that the user would like for system 100 to track the pattern. In various examples, a set of actions stored in the non-transitory computer-readable memory may be referred to as a "stored pattern of actions". In various examples, a user may have the option of deleting one or more activities from a previously-stored pattern. Additionally, in some examples, a user may have the option of deleting a stored pattern. Storing a pattern may comprise storing feature representation data representing the set of constituent actions corresponding to and/or making up the pattern in memory, as shown in data structure 455 in FIG. 4B. Feature representation data representing a pattern may comprise data representing actions making up the pattern, persons associated with the pattern, objects associated with the patterns, timeframes associated with the actions and/or pattern, etc. Generation of feature representation data representing a set of actions (e.g., a pattern) may represent an extraction of the various features from video data depicting the set of actions. The feature representation data may be embedded into a machine learning framework in order to classify the set of actions using one or more machine learning techniques.

FIG. 4B depicts an example data structure 455 storing feature representation data comprising numerical representations of a set of actions corresponding to a pattern or habit, in accordance with various embodiments of the present disclosure. As described above, one or more patterns may be recognized and stored in a memory as pattern data. FIG. 4B illustrates four example patterns 460, 470, 480, and 490 stored in a data structure. The depiction of the data structure in FIG. 4B is for illustrative purposes only. Other data structures and data types may be used apart from what is shown and described in reference to FIG. 4B. In various examples, each of patterns 460, 470, 480, and 490 may be associated with one or more actions. Actions may be stored as action feature representation data. In the example depicted in FIG. 4B, pattern 460 may comprise actions 462*a*, 462*b*, . . . , 462*n*. Similarly, pattern 470 may comprise action 472*a*, pattern 480 may comprise actions 482*a* and 482*b*, and pattern 490 may comprise actions 492*a*, 492*b*, . . . 492*n*. As described above, patterns may be detected over time using one or more machine learning models and/or action/time histograms. The action/time histograms may be used to determine time interdependence of various actions making up a pattern and to determine the relative frequency of occurrence of patterns and/or constituent actions of a pattern.

In various examples, patterns and constituent actions may be associated with one or more persons. In the example depicted in FIG. 4B, pattern 460 is associated with person 150*a*, patterns 470 and 490 are associated with person 150*b*, and pattern 480 is associated with person 150*c*. Additionally, constituent actions of a pattern may be associated with one or more objects and/or other persons. For example, pattern 460 may represent a repeated event performed by person 150*a*. In the example, pattern 460 may represent person 150*a* playing "fetch" with his dog (e.g., dog 177 of FIG. 1). Pattern 460 may comprise actions 462*a*, 462*b*, . . . 462*n*. In the example, action 462*a* may represent the person taking dog 177 to an outdoor area (e.g., outdoor space 114). Accordingly, action 462*a* may be associated with the "object" dog 177 and with the person 150*a*. Both person 150*a* and dog 177 may be detected and recognized by video processing device(s) 140. Although not depicted in FIG. 4B, various actions may also be associated with particular timeframes (e.g., average times-of-day and/or average time intervals during particular days) and/or with particular camera devices (and thus with the locations monitored by the particular camera devices). To continue the example, pattern 460 may continue with action 462*b*, which may represent person 150*a* throwing a ball. In the example, the ball may be an object recognized by video processing device(s) 140. In a final action 462*n* of pattern 460, the dog may return the thrown ball. Accordingly, action 462*n* may be associated with both the dog and the ball. In example pattern 460, the sequence of actions is important. However, in various other examples, the sequence may be irrelevant to the pattern. In at least some examples, feature representation data representing a pattern may include numerical indicator data indicating whether or not the sequence of actions of a particular pattern may be of importance.

In another example, pattern 470 may represent person 150*b* going to bed. Accordingly, pattern 470 may include a single action 472*a* in which person 150*b* interacts with bed 174 (thus the "Second Action" and "Final Action" are shown in FIG. 4B as "N/A"). It should be appreciated that in other examples, a pattern of a person getting into bed may comprise multiple actions (e.g., turning back the covers, arranging the pillows, etc.). Additionally, as previously mentioned, action 472*a* may be associated with a particular timeframe (e.g., an average time of day at which person goes to bed) and/or with a particular camera device (and thus location). In the instant example, action 472*a* may be associated with camera device 120*b* in bedroom 104. It should also be appreciated that in pattern 470 action 472*a* could also be represented as both the First Action and the Final Action since pattern 470 includes only a single action. Similarly, in pattern 480, action 482*b* could also be represented as the Final Action, since it is both the second and final action in pattern 480.

In various examples, actions and/or patterns may not be associated with any objects. For example, pattern 480 may comprise two actions 482*a* and 482*b*. Although both actions may be associated with person 150*c* (and each action may be associated with a timeframe and/or one or more camera devices), in the current example, neither of actions 482*a* and 482*b* are associated with any other objects apart from person 150*c*. Patterns 460, 470, 480, and 490 may be stored as feature representation data. In various examples, feature representation data may be a multi-variate vector representing a particular pattern, including associated persons, actions, timeframes, and/or objects.

As previously discussed, video processing device(s) 140 may determine when a previously-identified person or object is interacting in accordance with a previously-stored pattern and/or action. In various examples, video processing device(s) 140 may be configured to send a notification to a user when a person deviates from a particular pattern. For example, if a determination is made that person 150*c* has forgotten phone 175 when performing pattern "Leaving for Work", video processing device(s) 140 may send a notification to a user alerting them that person 150*c* has forgotten their phone. Similarly, if a pattern for person 150*a* involves the action "Walk dog" prior to the action "Leave for Work" and person 150*a* has not walked the dog and appears to be leaving for work, video processing device(s) 140 may send a reminder to person 150*a* to walk the dog.

Figure 5:
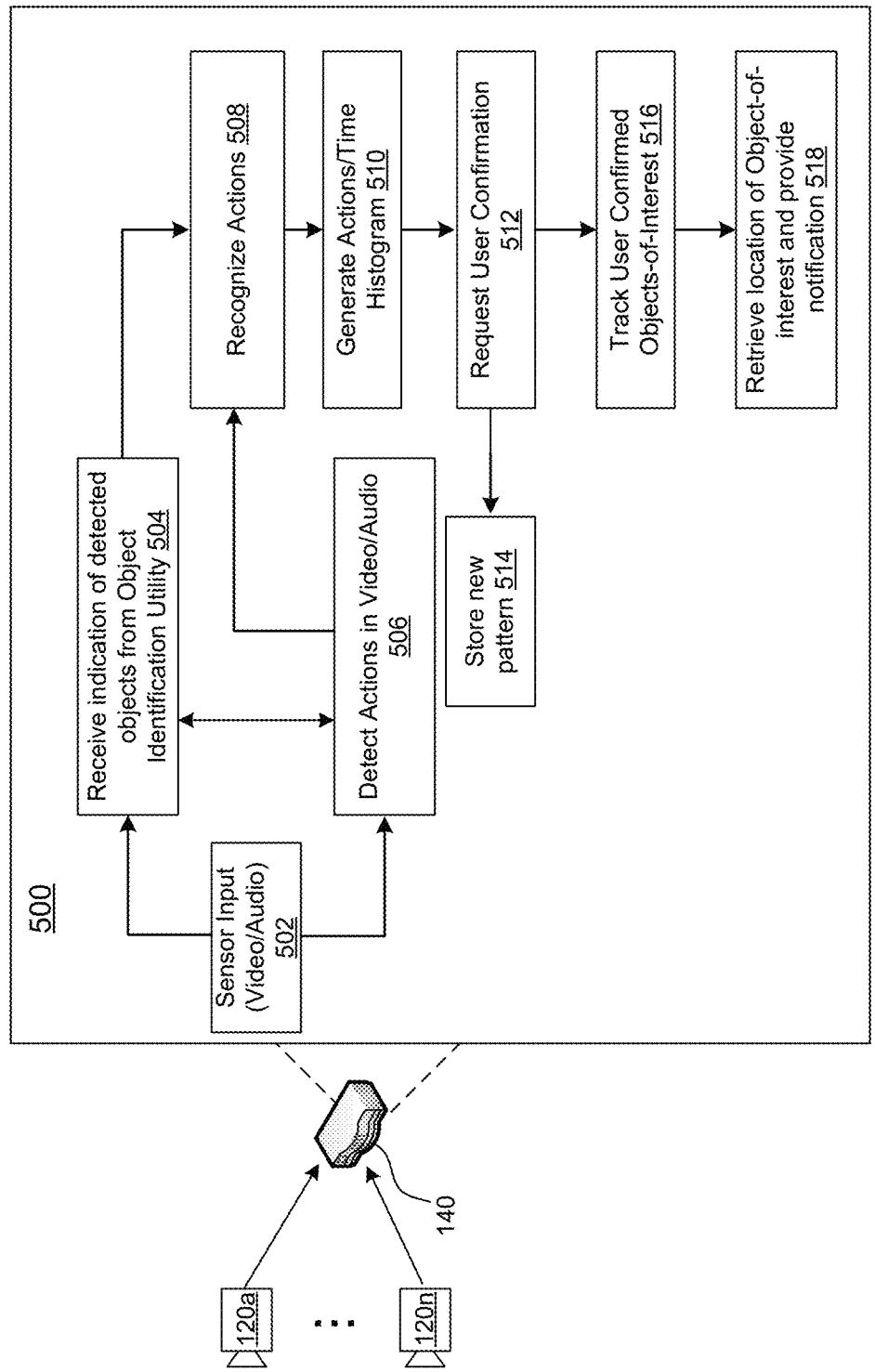
FIG. 5 depicts an example process for pattern recognition and object tracking, in accordance with various embodiments of the present disclosure.

FIG. 5 depicts example process 500 for pattern recognition and object tracking, in accordance with various embodiments of the present disclosure. In various examples, processing may begin at operation 502, at which video processing device(s) 140 may receive video data and/or audio data from one or more sensors. For example, one or more of camera devices 120*a*, 120*b*, 120*c*, 120*d*, 120*e*, 120*f*, and 120*g* of FIG. 1 may send image data, video data, and/or audio data to video processing device(s) 140.

Process 500 may continue from operation 502 to operation 504, "Receive indication of detected objects from Object Identification Utility". At operation 504, video processing device(s) 140 may receive indications of detected and/or recognized objects from object identification utility 152. For example, as previously described in reference to FIGS. 2 and 3 object identification utility 152 may be effective to user machine learning techniques to detect and recognize one or more objects in image data, video data, and/or audio data (or some combination thereof).

In various examples, video processing device(s) 140 (e.g., pattern learning utility 154) may be effective to perform operation 506 "Detect actions in video/audio". In at least some examples, operation 506 may be performed in parallel with operation 504, while in other examples, operation 506 may be performed before or after operation 504. At operation 506, one or more actions may be detected. For example, if an identified person (e.g., person 150*a*) is determined to be interacting with an identified object (e.g., bed 174), video processing device(s) 140 may detect an action—"Person 150*a* going to bed". The action may be assigned identifier data identifying the action from among other actions by pattern learning utility 154. Additionally, the action may be assigned a name by a user of system 100 (e.g., at action 410, described in further detail below). A feature vector representing the action may be generated using a machine learning model. As previously described, LSTM models may be beneficial due to the often sequential nature of actions making up a particular action.

In various examples, video processing device(s) 140 may be effective to perform operation 508, "Recognize actions". At operation 508 actions may be recognized using one or more classifiers trained to recognize actions in video data and/or audio data. For example, the one or more classifiers may be effective to compare a feature representation for a current action to stored feature representations of previously known actions. As used herein, an action may refer to a movement or activity by a person, pet, and/or object during a particular time period. For example, a user of system 100 may be engaged in throwing a ball with a dog during a first time. Throwing the ball with the dog may be an example of a "pattern" of user activity. The pattern may comprise one or more separate actions. For example, a first action may be the user throwing the ball. A second action may be the dog retrieving the ball. A third action may be the dog returning the ball to the user. In at least some examples, a pattern may comprise a single action. In other examples, a pattern may comprise multiple actions. Actions and/or patterns may involve one or more previously-detected persons, pets, and/ or objects. New, previously-unidentified actions may be assigned an identifier and may be stored in a memory associated with video processing device(s) 140.

Processing may continue from operation 508 to operation 510, "Generate Action/Time Histogram". At operation 510, pattern learning utility 154 may generate a histogram of detected actions associated with the times at which the detected actions have occurred. In other words, a distribution of actions over time may be generated. New actions (previously unrecognized actions) may initially have a value of zero. Upon subsequent detection of the new action occurring in the video and/or audio data, the counter for the new actions may be incremented or otherwise increased.

Processing may continue from operation 510 to operation 512, "Request user confirmation". At operation 512, one or more patterns of actions may be determined using the histogram generated at operation 510. Various techniques may be used to determine a pattern. For example, pattern learning utility 154 may determine that action 1, action 2, and action 3, involving person 150a, have occurred between 17:30 and 17:35 more than 10 times during a two week period. Pattern learning utility 154 may determine that actions 1, 2, and 3 are part of a pattern of activity for person 150a. Accordingly, at operation 410, video processing device(s) 140 may request a confirmation that person 150a (or another user of the system 100) would like system 100 to track a pattern comprising actions 1, 2, and 3. In various examples, video processing device(s) 140 may request user confirmation through a companion application. Additionally, system 100 may provide one or more configuration options to a user of system 100. For example, configuration options may include providing a user with an ability to name a particular pattern and/or action, providing the user with an option to be reminded about the particular pattern, and/or action, an option to forget or "not track" the particular pattern and/or action. In various examples, the system 100 may provide video clips, audio clips, and/or still images to the user representing the pattern and/or one or more of the actions of the pattern in order to provide information regarding the actions and/or patterns to the user to provides cues to the user for the purposes of naming and/or user recognition of the patterns and/or actions.

Processing may continue from operation 512 to operation 514, "Store new pattern". Upon receiving user confirmation at operation 512, video processing device(s) 140 may store any new patterns in a non-transitory computer-readable memory associated with video processing device(s) 140. In at least some examples, video processing device(s) 140 may store a pattern only when a user has confirmed that the user would like for system 100 to track the pattern. In various examples, a user may have the option of deleting one or more activities from a previously-stored pattern. Storing a pattern may comprise storing feature representation data representing the pattern in memory. Generation of feature representation data representing a pattern may represent an "embedding" of the pattern for purposes of classifying the pattern using one or more machine learning techniques.

In various examples, at operation 516, system 100 may track various objects-of-interest. Objects-of-interest may be designated and/or confirmed by a user of system 100 through a companion application and/or another user interface. For example, a user may select one or more objects detected in a frame of image data displayed to the user by a companion application or other user interface. A user may be provided with an option to track one or more objects-of-interest. The user may select objects-of-interest for tracking by system 100. For example, a user may select one or more bounding boxes surrounding detected objects detected by object identification utility 152. Thereafter, system 100 may be effective to track the user-designated objects-of-interest and may store the location of objects-of-interest in a non-transitory computer-readable memory associated with system 100.

In various further examples, at action 518, video processing device(s) 140 may receive a user request for the current location of a tracked object-of-interest. In various examples, the user request may be made through an interface provided on a companion application for system 100 or some other interface (e.g., a browser-based interface). Video processing device(s) 140 may retrieve the last known location of the requested object-of-interest from the memory and may provide information indicating the location of the object-of-interest in response to the user request. In some examples, the video processing device(s) 140 may display a frame of image data and/or a video clip displaying a location of the requested object-of-interest. In some examples, the video processing device(s) 140 may provide highlighting and/or annotation to emphasize the location of the requested object-of-interest in the frame or video.

In at least some examples, a user may configure system 100 to send one or more push notifications to a mobile computing device associated with the user. In various examples, the notifications may be reminders for a user to engage in a particular pattern of activity (e.g., "Play with dog") during a time associated with the previously-recognized pattern. In various other examples, the notification may be an alert that a particular activity is occurring. For example, system 100 may recognize that a child (a previously-recognized individual) is interacting with an object known to pose a danger, such as a sharp object, or a dangerous piece of equipment. The system 100 may recognize the pattern as corresponding to a pattern for which the user has requested a notification and may send the notification to the user. In various examples, video data and/or audio data may be provided to the user displaying the recognized pattern. In various other examples, the user may be able to send video and/or audio data to a particular speaker associated with the camera device or devices detecting the pattern through the companion application or other user interface. As such, the camera devices may function as an intercom-like system enabling the user to provide video and/or audio messages remotely. In the above example, the user may be a parent. The system may recognize based on a known pattern (e.g., a known pattern of detected and recognized actions) that a child is interacting with a dangerous object. The parent may be able to send audio data for playback by a speaker associated with a camera device in proximity to the dangerous object to warn the child.

Additionally, in some examples, system 100 may send push notifications when a deviation from a known pattern is detected. For example, if a determination is made that a known user is leaving the house without her keys (an object-of-interest), a push notification may be sent to the user's mobile device. In another example, if a determination is made that a known user is currently in the kitchen at timeframe X, but that timeframe X is associated with a pattern—"Pick up kids from school", system 100 may send a notification to a mobile device of the user to alert the user that they are deviating from the previously-known pattern. As previously described, system 100 may be configurable such that only user-confirmed patterns are tracked.

Among other potential benefits, a system in accordance with the present disclosure may allow patterns of actions associated with users of a monitored location to be learned and tracked. Additionally, objects and people may be recognized and associated with known patterns. Thereafter, the system may be configured to send reminders to users regarding the patterns and/or regarding deviations from known patterns. Additionally, in accordance with various embodiments described herein, the system may be effective to track the location of objects of interest to one or more users. The users may request that the system locate the objects. The system may provide a user with a location of the object based on tracking the object through object detection and recognition techniques. Accordingly, the user may use the system to locate missing objects (e.g., wallet, keys, remote control, etc.).

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of providing user assistance via an imaging system comprising a video processing device and a first camera device, the method comprising:
   receiving, at the video processing device from the first camera device, first video data comprising a plurality of frames captured during a first time period;
   determining, by the video processing device, a first set of pixels representing at least a portion of a first person in a first frame of the plurality of frames;
   generating, by the video processing device, first feature representation data representing the first set of pixels;

determining, by the video processing device, an identity of the first person by determining that the first feature representation data corresponds to second feature representation data of the first person stored in a computer-readable non-transitory memory;

determining, by the video processing device using the first video data, a first set of actions being performed by the first person, the first set of actions corresponding to a first pattern;

generating, by the video processing device, third feature representation data representing the first set of actions;

determining, by the video processing device, that the third feature representation data does not correspond to fourth feature representation data stored in the computer-readable non-transitory memory, wherein the fourth feature representation data represents a second set of actions previously performed by the first person, the second set of actions corresponding to a second pattern; and sending, by the video processing device to a mobile device associated with the first person, a notification.

2. The method of claim 1, further comprising:

receiving, at the video processing device from the first camera device, second video data comprising a second plurality of frames;

determining, by the video processing device, a second set of pixels representing a first object in a second frame of the second plurality of frames;

generating, by the video processing device, fifth feature representation data representing the second set of pixels representing the first object;

storing, by the video processing device, the fifth feature representation data in the computer-readable non-transitory memory;

receiving, from the mobile device at the video processing device, instructions to track the first object;

receiving, at the video processing device from the first camera device a third frame;

determining, by the video processing device, a third set of pixels representing the first object in the third frame;

generating, by the video processing device, sixth feature representation data representing the third set of pixels representing the first object;

determining, by the video processing device that the sixth feature representation data corresponds to the fifth feature representation data; and sending, by the video processing device to the mobile device, a message indicating a location of the first object.

3. The method of claim 1, further comprising:

receiving, at the video processing device from the first camera device, second video data comprising a second plurality of frames;

determining, by the video processing device, a second set of pixels representing at least a second portion of the first person in a second frame of the second plurality of frames;

generating, by the video processing device, fifth feature representation data representing the second set of pixels;

determining, by the video processing device, the identity of the first person by determining that the fifth feature representation data corresponds to the second feature representation data of the first person stored in the computer-readable non-transitory memory;

determining, by the video processing device using the second video data, a third set of actions being performed by the first person, the third set of actions corresponding to a third pattern;

generating, by the video processing device, sixth feature representation data representing the third set of actions;

determining, by the video processing device, that the sixth feature representation data does not correspond to any feature representation data stored in the computer-readable non-transitory memory; and sending, by the video processing device to the mobile device, a request for instructions to store the sixth feature representation data as a new pattern, wherein the request for instructions to store the sixth feature representation data comprises a request for a user to name the new pattern.

4. A method comprising:

receiving first video data;

determining a first set of pixels representing at least a portion of a first person in the first video data;

generating first feature representation data for the first set of pixels;

determining that the first feature representation data corresponds to second feature representation data stored in a computer-readable non-transitory memory;

determining an identity of the first person associated with the second feature representation data;

determining a first action performed by the first person during a first timeframe of the first video data;

determining a second action performed by the first person during a second timeframe of the first video data;

determining a previously-learned pattern for the first person, the previously-learned pattern comprising a first set of actions associated with the first person, wherein the previously-learned pattern associates the first action with the first timeframe and the second action with the second timeframe;

generating third feature representation data representing the first set of actions; and storing the third feature representation data in the computer-readable non-transitory memory.

5. The method of claim 4, further comprising sending a notification to a computing device, the notification comprising a reminder for the first person to engage in the first set of actions.

6. The method of claim 4, wherein determining the first action performed by the first person during the first timeframe of the first video data further comprises determining a second set of pixels representing a first object with which the first person interacts during the first timeframe of the first video data, the method further comprising:

generating fourth feature representation data for the second set of pixels;

determining that the fourth feature representation data does not correspond to any feature representation data stored in the computer-readable non-transitory memory; and sending a notification to a computing device, the notification comprising a prompt for instructions to track the first object.

7. The method of claim 6, further comprising:

receiving a request to locate the first object; and sending a second notification to the computing device, the second notification comprising an indication of a location of the first object.

8. The method of claim 4, wherein the first action comprises the first person interacting with a first object, the method further comprising:

receiving third video data captured at a third timeframe corresponding to the first timeframe;

determining, from the third video data, that the first person is not interacting with the first object during the third timeframe; and sending a notification to a computing device accessible by the first person, the notification comprising a reminder that the first person typically interacts with the first object during the third timeframe.

9. The method of claim 4, further comprising:

receiving second video data;

determining a second set of pixels representing at least a portion of a second person in the second video data;

generating fourth feature representation data for the second set of pixels;

determining that the fourth feature representation data does not correspond to any feature representation data stored in the computer-readable non-transitory memory;

sending a notification to a computing device, the notification comprising a request to identify the second person;

receiving, from the computing device, an identifier for the second person; and storing the identifier in association with the third feature representation data in the computer-readable non-transitory memory.

10. The method of claim 4, further comprising:

increasing a first counter value corresponding to the first action in a histogram, wherein the first counter value indicates a first number of times the first action has occurred during the first timeframe;

increasing a second counter value corresponding to the second action in the histogram, wherein the second counter value indicates a second number of times the second action has occurred during the second timeframe; and wherein the previously-learned pattern is determined based at least in part on the first counter value and the second counter value.

11. The method of claim 4, further comprising:

receiving second video data;

determining a third action performed by the first person during a third timeframe of the second video data;

determining a second previously-learned pattern for the first person, the second previously-learned pattern comprising a second set of actions associated with the first person, wherein the second previously-learned pattern associates the third action with the third timeframe;

generating fourth feature representation data representing the second set of actions; and determining that the fourth feature representation data corresponds to fifth feature representation data representing a stored set of actions for the first person.

12. The method of claim 4, further comprising:

receiving audio data captured at a third timeframe corresponding to the first timeframe;

generating fourth feature representation data for the audio data;

determining that the fourth feature representation data corresponds to the third feature representation data stored in the computer-readable non-transitory memory; and determining that the first person is performing the previously-learned pattern comprising the first set of actions based at least in part on the audio data.

13. A computing device system, comprising:

at least one processor; and a computer-readable non-transitory memory storing instructions that, when executed by the at least one processor, are effective to program the at least one processor to:

receive first video data;

determine a first set of pixels representing at least a portion of a first person in the first video data;

generate first feature representation data for the first set of pixels;

determine that the first feature representation data corresponds to second feature representation data stored in the computer-readable non-transitory memory;

determine an identity of the first person associated with the second feature representation data;

determine a first action performed by the first person during a first timeframe of the first video data;

determine a second action performed by the first person during a second timeframe of the first video data;

determine a previously-learned pattern for the first person, the previously-learned pattern comprising a first set of actions associated with the first person, wherein the previously-learned pattern associates the first action with the first timeframe and the second action with the second timeframe;

generate third feature representation data representing the first set of actions; and store the third feature representation data in the computer-readable non-transitory memory.

14. The computing system of claim 13, wherein the instructions, when executed by the at least one processor, are further effective to program the at least one processor to:

send a notification to a computing device, the notification comprising a reminder for the first person to engage in the first set of actions.

15. The computing system of claim 13, wherein the determination of the first action comprises determining a second set of pixels representing a first object with which the first person interacts during the first timeframe of the first video data, and wherein the instructions, when executed by the at least one processor, are effective to program the at least one processor to:

generate fourth feature representation data for the second set of pixels;

determine that the fourth feature representation data does not correspond to any feature representation data stored in the computer-readable non-transitory memory; and send a notification to a computing device, the notification comprising a prompt for instructions to track the first object.

16. The computing system of claim 15, wherein the instructions, when executed by the at least one processor, are effective to program the at least one processor to:

receive a request to locate the first object; and send a second notification to the computing device, the second notification comprising an indication of a location of the first object.

17. The computing system of claim 13, wherein the first action comprises the first person interacting with a first object, and wherein the instructions, when executed by the at least one processor, are effective to program the at least one processor to:

receive third video data captured at a third timeframe corresponding to the first timeframe;

determine, from the third video data, that the first person is not interacting with the first object during the third timeframe; and send a notification to a computing device accessible by the first person, the notification comprising a reminder that the first person typically interacts with the first object during the third timeframe.

18. The computing system of claim 13, wherein the instructions, when executed by the at least one processor, are effective to program the at least one processor to:
receive second video data;
determine a second set of pixels representing at least a portion of a second person in the second video data;
generate fourth feature representation data for the second set of pixels;
determine that the fourth feature representation data does not correspond to any feature representation data stored in the computer-readable non-transitory memory;
send a notification to a computing device, the notification comprising a request to identify the second person;
receive, from the computing device, an identifier for the second person; and
store the identifier in association with the third feature representation data in the computer-readable non-transitory memory.

19. The computing system of claim 18, wherein the instructions, when executed by the at least one processor, are effective to program the at least one processor to:
increase a first counter value corresponding to the first action in a histogram, wherein the first counter value indicates a first number of times the first action has occurred during the first timeframe;
increase a second counter value corresponding to the second action in the histogram, wherein the second counter value indicates a second number of times the second action has occurred during the second timeframe; and
wherein the previously-learned pattern is determined based at least in part on the first counter value and the second counter value.

20. The computing system of claim 13, wherein the instructions, when executed by the at least one processor, are effective to program the at least one processor to:
receive second video data;
determine a third action performed by the first person during a third timeframe of the second video data;
determine a second previously-learned pattern for the first person, the second previously-learned pattern comprising a second set of actions associated with the first person, wherein the second previously-learned pattern associates the third action with the third timeframe;
generate fourth feature representation data representing the second set of actions; and
determine that the fourth feature representation data corresponds to fifth feature representation data representing a stored set of actions for the first person.

\* \* \* \* \*